Figure 1:
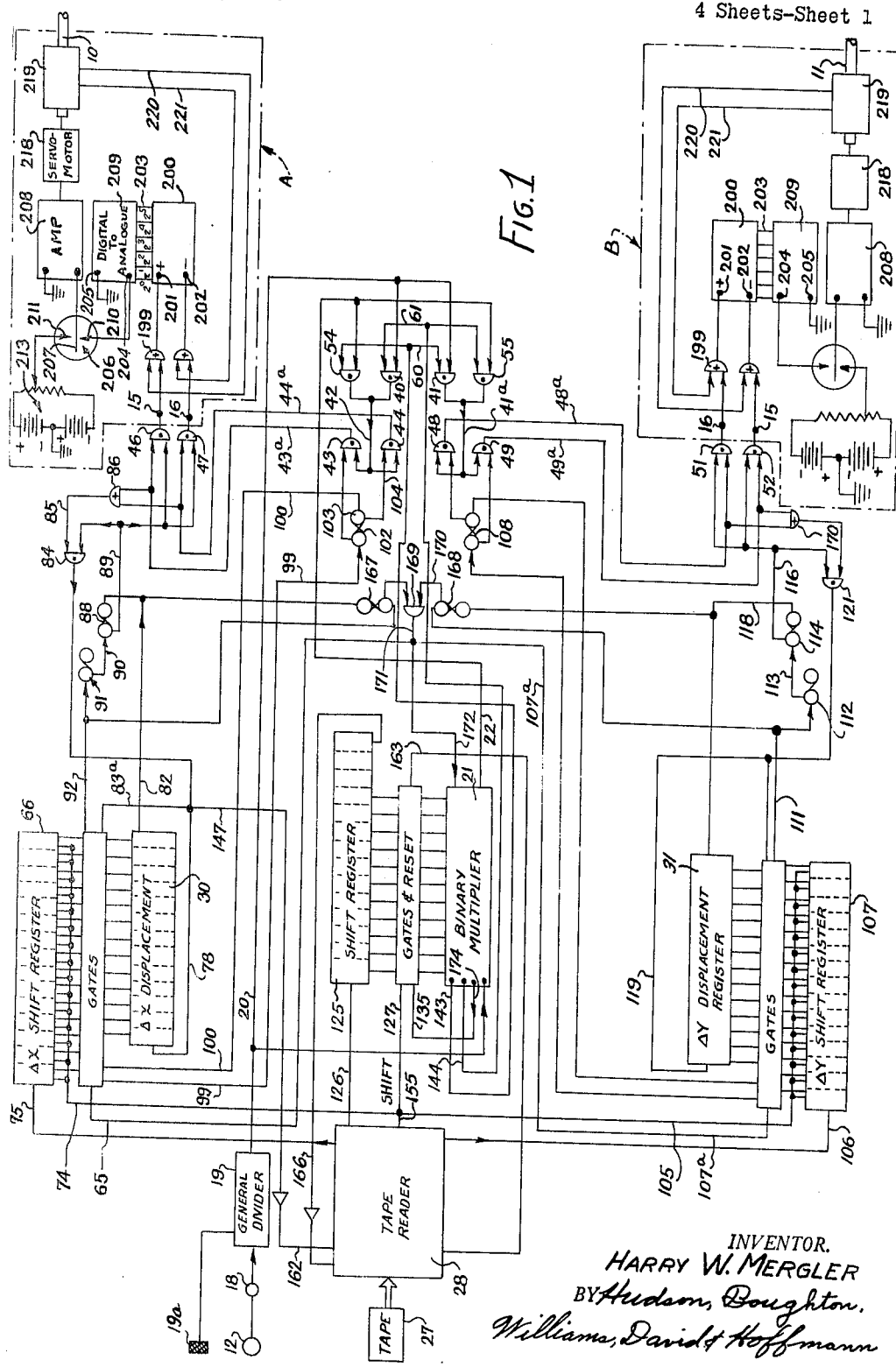

April 12, 1966     H. W. MERGLER     3,246,125
NUMERICAL CONTROL SYSTEM FOR A MACHINE TOOL
Filed March 21, 1960     4 Sheets-Sheet 1

INVENTOR.
HARRY W. MERGLER
BY Hudson, Boughton,
Williams, David & Hoffmann
ATTORNEYS April 12, 1966    H. W. MERGLER    3,246,125
NUMERICAL CONTROL SYSTEM FOR A MACHINE TOOL
Filed March 21, 1960    4 Sheets-Sheet 2

INVENTOR.
HARRY W. MERGLER
BY Hudson, Boughton,
Williams, David & Hoffmann
ATTORNEYS INVENTOR.
HARRY W. MERGLER
BY Hudson, Boughton,
Williams, David & Hoffmann
ATTORNEYS

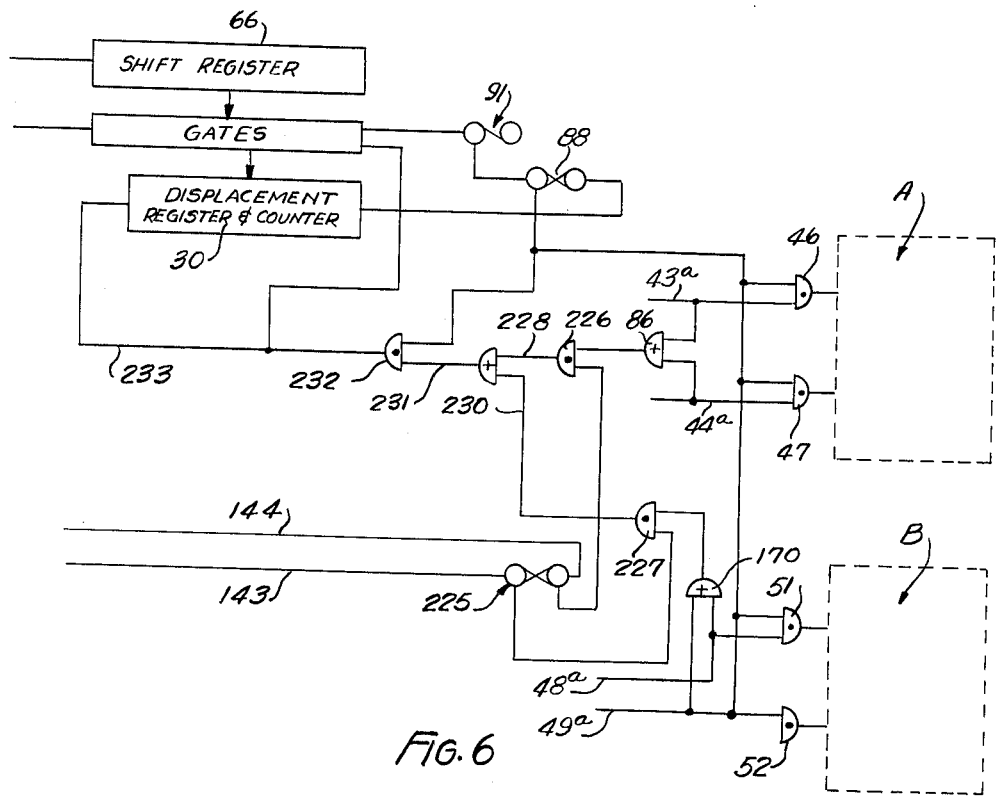

United States Patent Office 3,246,125
Patented Apr. 12, 1966

3,246,125
NUMERICAL CONTROL SYSTEM FOR A
MACHINE TOOL
Harry W. Mergler, Cleveland, Ohio, assignor to The
Warner & Swasey Company, Cleveland, Ohio, a corporation of Ohio
Filed Mar. 21, 1960, Ser. No. 16,545
6 Claims. (Cl. 235—61.6)

The present invention relates to systems for representing, by digital pulse trains, motions along different coordinate axes to define the direction and/or extent of a resultant and, more particularly, to such a system wherein a plurality of resultants defining a locus are successively defined by the pulse trains and are utilized to effect motion along the axes in timed relation to the rotation of a spindle.

An important object of the present invention is to provide a new and improved, simplified system for digitally representing components which lie along coordinate axes and which define the direction and/or extent of a desired resultant.

Another object of the present invention is to provide a new and improved, simplified record-controlled system for effecting movement of an element in timed relation to the rotation of a spindle, which movement is the resultant of motion along coordinate axes effected in response to the record by a digital servo loop, the system being constructed and arranged so as to require a minimum number of parts to effect the necessary control in accordance with the intelligence on the record.

Still another object of the present invention is to provide a new and improved record-controlled system for effecting successive movements along coordinate axes which are components of successive resultants and wherein a pulse train of a given frequency is provided to effect movement along one of the coordinate axes when a particular one of the components is the larger and to effect movement along the other of the axes when the other of the components is the larger and a related and variable frequency pulse train is provided to effect movement along the axis different from the one along which the given pulse train effects movement.

A further object of the present invention is to provide a new and improved method and apparatus for operating a machine tool to move an element thereof along a path having first and second components of motion along coordinate axes, the movement to be in timed relation to the rotation of the machine tool spindle, the method and apparatus being such that a pulse train having a given frequency dependent upon the speed of spindle rotation is used to effect movement along one of the coordinate axes when one of the components is to be greater than the other component and along the other coordinate axis when the other component of movement is greater than the first-mentioned component and wherein a pulse train having a frequency related to the pulse train from the spindle by a factor which is the function of the slope of the desired movement is applied to effect movement along the axis different from the one to which the spindle pulse train is applied.

A still further object of the present invention is to provide a new and improved digital servo loop in which an error counter is used to sum command pulses and motion pulses to provide an error signal to effect motion to reduce the error signal to zero, the system being such that the bidirectional error counter is adapted to effect motion in either of two opposite directions and so that the counter is not required to count through zero during normal operation of the system.

Figure 2:
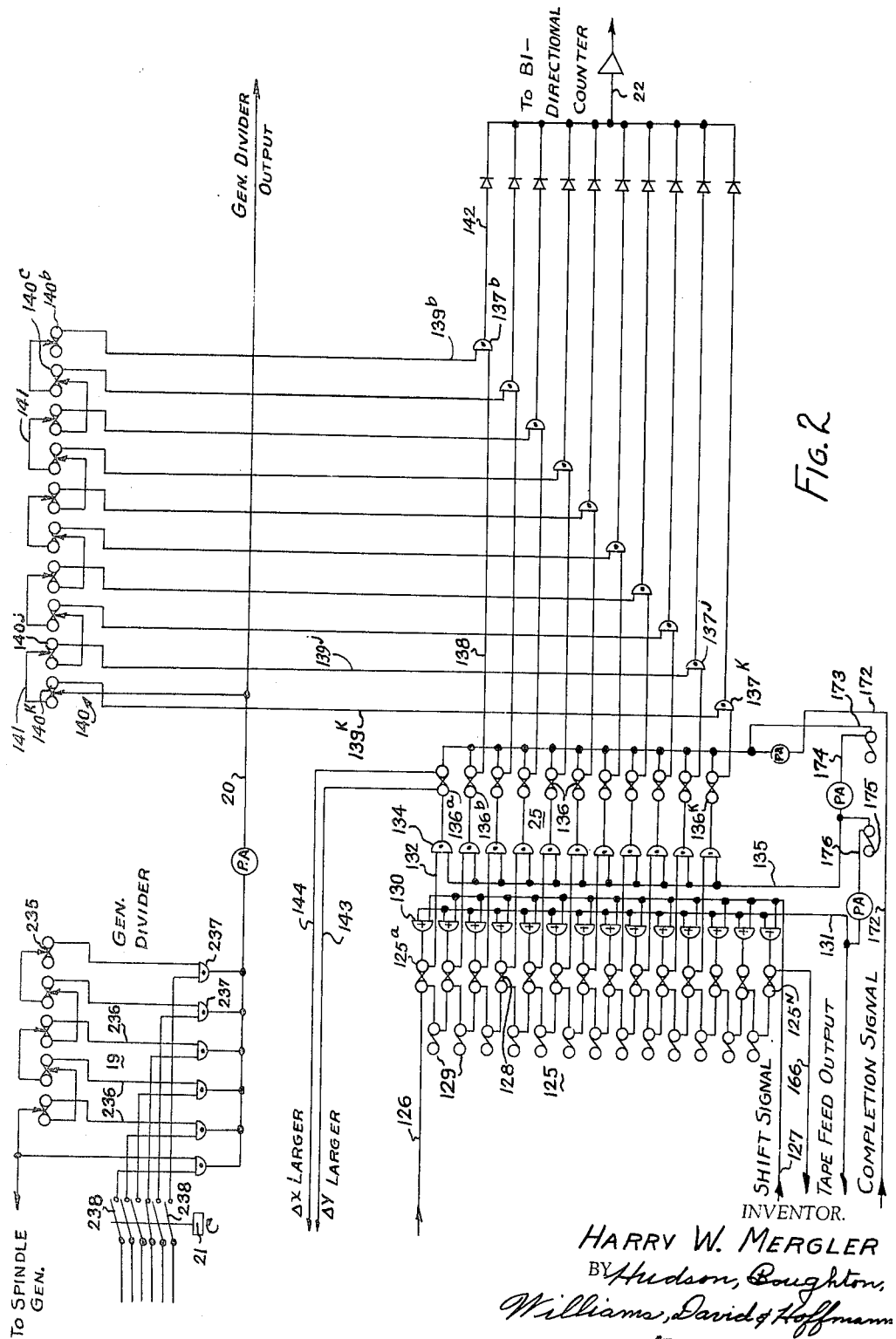
Figure 3:
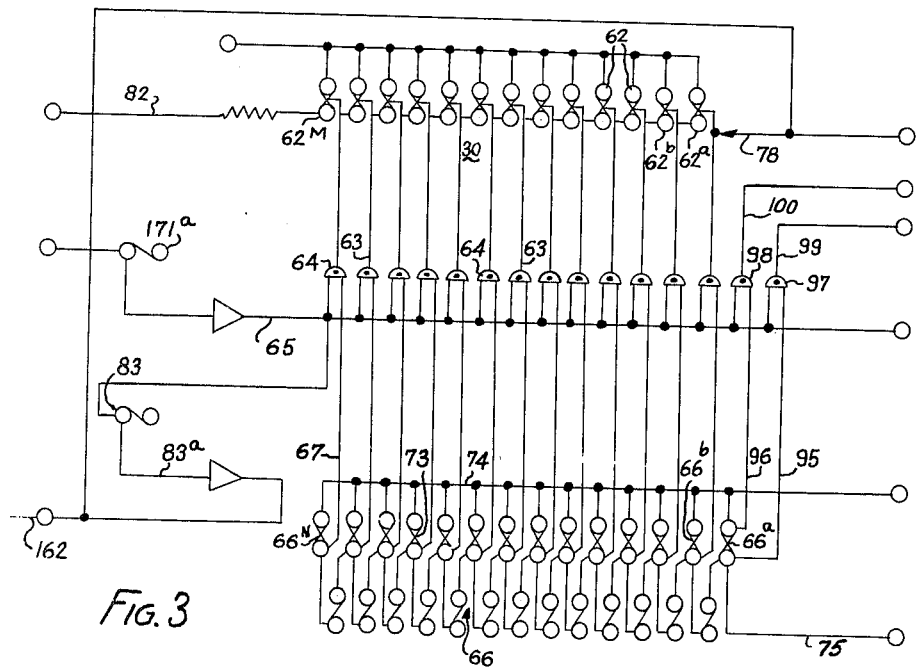
Figure 4:
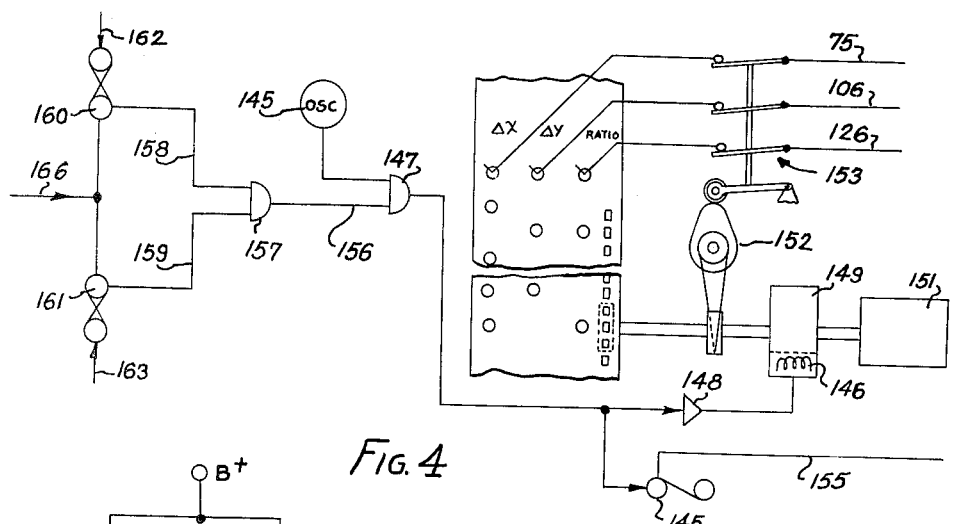
Figure 5:
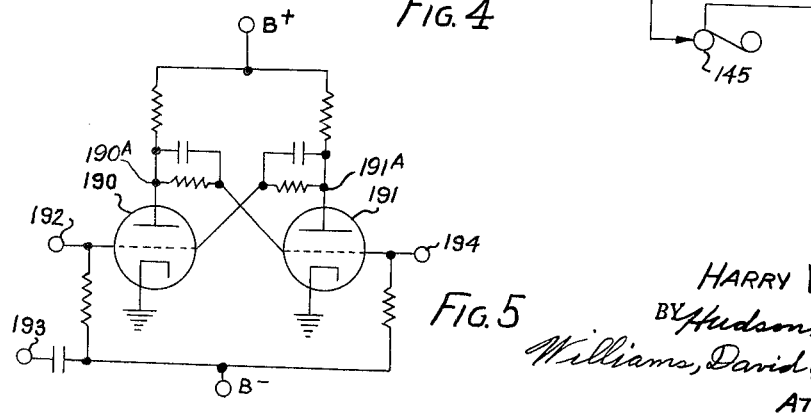

Further objects and advantages of the present invention will be apparent from the following detailed description of the present invention made with reference to the accompanying drawings forming a part of the present specification and in which:

FIG. 1 is a diagrammatic showing of a control system embodying the present invention;
FIG. 2 is a logic diagram of a portion of the circuit of FIG. 1;
FIG. 3 is a logic diagram of a register and counter used in the circuit of FIG. 1;
FIG. 4 is a schematic diagram of a tape reader and control circuit therefor;
FIG. 5 is a circuit diagram of a bistable multivibrator circuit; and
FIG. 6 is a logic diagram showing a modification of the system of FIG. 1.

While the present invention is susceptible of various modifications and constructions and of various uses, it is particularly advantageous when embodied in a machine tool to effect the movements of elements thereof along coordinate axes in timed relation to the rotation of a spindle. For example, if the present invention is embodied in a lathe, it may be utilized to effect movement of the tool to contour a workpiece in timed relation to the rotation of the spindle. The cross slide carriage of the lathe may be moved in timed relation to the spindle to produce movement along one coordinate axis and the cross slide may be moved to produce movement along a second coordinate axis, the movement of a tool supported by the cross slide being a resultant of the movement along the coordinate with the direction of the resultant being dependent on the velocity of the movements along the axes and the movement being in timed relation to the rotation of the spindle. While the drawings do not show a lathe, the drawings indicate that the system is utilized to drive lead screws 10, 11 for effecting movement along X and Y coordinate axes. When embodied in a lathe, the cross slide carriage may be considered as moving along the X coordinate axis and the lead screw 10 would therefore be the lead screw for effecting movement of the carriage while the lead screw 11 would be the lead screw for effecting movement of the cross slide. Inasmuch as the present invention relates to the system for producing the rotation of the lead screws, it is not considered necessary to disclose the structure of the cross slide and cross slide carriage or of the spindle, inasmuch as the structures are conventional. The lathe spindle is indicated schematically at the left-hand side of FIG. 1 and is indicated by the reference numeral 12.

The system is one which is particularly adapted to effect the contouring of a workpiece under the control of a record, such as a punched tape, carrying binary coded intelligence, which defines successive discrete points on a locus along which the center of the tool is to be moved in terms of coordinates which are the displacements of each point along coordinates axes from the preceding point on the locus and in which system the tool is to be moved from point to point thereon by successively effecting motions along the respective coordinate axes at velocities having magnitudes related to each other as the ratio of the coordinates of the point to which the tool is moving whereby the resultant motion of the tool defines said locus. In such a system the binary coded intelligence is successively converted into pulse trains which represent the coordinates of successive points and the velocities of movements along the coordinates necessary to move to the next point on the locus. When the present invention is utilized in this type of system, a pulse train of a predetermined frequency, preferably of a frequency determined by spindle speed, is utilized to digitally represent a first one of the coordinates of the point toward which the tool is moving, the number of pulses in the train representing a unit of displacement along the corresponding coordinate axis, when one coordinate is large than the other and to represent the second one of the coordinates when the relationship is reversed, the coordinate not being represented by the pulse train of predetermined frequency being represented by a related pulse train having frequency related to the frequency of the first pulse train is a function of the ratio of the coordinates. The pulse trains representing the coordinates are applied to effect motion along the corresponding axes at a rate corresponding to the frequency of trains to effect the desired movement of the tool.

The screws 10, 11 for effecting movement along the coordinate axes are driven by pulse-responsive servo systems A, B of the error counter type. The pulse-responsive servo systems A, B each effect rotation of the corresponding lead screws at a rate dependent upon the frequency of a train of command pulses applied thereto and since the direction of the resultant of the motions along the axes is dependent on the velocities along the axes, the frequencies of the pulse train will determine the slope of the resultant of the movements produced by the servos A, B. Each of the command pulses in the trains effects a unit rotation of the corresponding screw and to effect a desired displacement along the corresponding co-ordinate axis, a number of pulses corresponding to the number of units of movement along the respective axis are applied to the corresponding one of the servo systems A, B. The servo systems A, B may operate to rotate the screws in either direction to produce either positive or negative movement along the corresponding coordinate axis. The servos A, B each have add and subtract terminals 15, 16, and when a command pulse train is applied to the input terminal 15, rotation of the corresponding lead screw is effected in one direction; and when applied to the input terminal 16, rotation is effected in the opposite direction. The servo systems A and B will be described in further detail hereinafter.

In the preferred embodiment the pulse trains which are applied to the servo systems A, B are derived from a pulse generator 18 which produces pulses having a frequency dependent upon spindle rotation. The pulse generator 18 may be one of any of the tachometer type pulse generators that can be driven from the spindle or in timed relation to the spindle. Furthermore, the pulse generator 18 may comprise any suitable pulse generator of variable frequency which is set or varied preferably in accordance with spindle rotation, for example, the control circuit for determining the rate of spindle rotation could also be so constructed as to set the frequency control for a variable frequency pulse generator. Such arrangements will be understood by those skilled in the art and for the present purposes it is only necessary to indicate that the pulse generator 18 produces pulses dependent on the rate of spindle rotation.

The output pulses from the spindle pulse generator are preferably applied to the input of a frequency multiplier or divider circuit 19. Hereinafter the circuit 19 will be referred to as a multiplier circuit since division is merely multiplying by a factor less than 1. The multiplier circuit 19 is in the illustrated embodiment, set manually, as indicated in FIG. 1, by a control knob 19a which may actuate a plurality of switches shown in FIG. 2, in accordance with its position to determine the factor by which the pulse train from the spindle generator is multiplied. In the illustrated embodiment, the circuit 19 multiplies the pulse train by a factor less than one and the logic thereof is shown in more detail in FIG. 2. The output of the multiplier circuit 19, hereinafter referred to as the spindle pulse train, appears on line 20 and may be selectively applied to any one of the input terminals 15, 16 through a series of gates which are controlled as hereinafter set forth to effect movement in either direction along either the X or Y axes selectively.

The spindle pulse train is also applied to the input of a second multiplying or dividing circuit, indicated schematically in FIG. 1 by the reference numeral 21 and designated on the drawings as "Binary Multiplier." The multiplying circuit 21, in the illustrated embodiment, multiplies the spindle pulse train by a factor less than one and the output of the binary multiplier 21 on a line 22 (FIG. 1), hereinafter referred to a the multiplier pulse train, may be selectively applied to any one of the terminals 15, 16 of the servo systems A, B through the aforementioned series of gates. In operation, the spindle pulse train is applied to effect operation of one of the servo systems and the multiplier pulse train to effect operation of the other servo system. In the illustrated embodiment, if the movement along the X axis is to be greater, i.e. at a higher rate, the spindle pulse train is applied to the servo A and the spindle pulse train multiplied by a suitable factor is applied to the servo B, and conversely.

Associated with the multiplying circuit 21 is a storage register 25 (FIG. 2) which is presettable to determine the factor by which the pulse train applied to the input of the circuit 21 is multiplied and also the respective servo systems A, B to which the output pulses on line 22 and line 20 are applied.

In addition to the above-described elements, the system includes an X displacement register and counter 30 and a Y displacement register and counter 31. The register and counters 30, 31 are adapted to be preset to any number within the counting range thereof and to add a count of one thereto for each pulse applied to the input thereof. The pulses to the servo system A, B are respectively applied to the counters 30, 31 and when the counters fill to capacity the registers issue signals to close the gates to the servo systems A, B to block further pulses from being aplied to the systems.

The registers 25, 30, 31 are preset in accordance with intelligence on a tape 27 which is read by a tape reader 28. The tape 27 has a series of orders thereon which represent successive movements to be effected by operation of the servo systems A, B. Each of the orders on the tape is set up in binary form with a plurality of words comprised of bits or digits which are read sequentially and utilized to set the displacement register and counters 30, 31 and the binary multiplier 21 to effect the desired movement. If the desired movement requires that the screw 10 be operated to effect ten units of movement along the X axis, the displacement register 30 is preset so that after it receives ten pulses an output signal will be given which will effect the closing of the gate for applying pulses to the servo system A. If at the same time, the Y screw is to be rotated to effect five units of movement along the Y coordinate axes, the displacement register and counter 31 is preset to provide an output signal after it has been pulsed five times to which signal is utilized to block additional pulses from being applied to the servo system B. Since the binary multiplier 21 multiplies the pulse train from the general divider 20 by a factor less than one, to accomplish the desired resultant when the X coordinate is larger than the component along the Y coordinate, the pulse train from the spindle must be applied to the servo system A for effecting movement along the X coordinate and the binary multiplier 21 must be set to multiply the pulse train by a factor which will cause the movement along the Y coordinate axes to take place at the rate necessary to produce the required movement along the Y axis at the same time that it takes to produce the component of movement along the X axis. It can be seen that if the Y component of movement is greater than the X component of movement, the command pulses from the multiplier 19 would then be applied to the servo system B, while pulses suitably divided by the binary multiplier 21 would be applied to the servo system A. It will also be appreciated that if the train from the spindle were multiplied by a factor greater than one, then the spindle pulse train would be applied to the servo system for effecting the component of movement which was the smaller, while the multiplied pulse train from the binary multiplier 21 would be applied to the servo system for producing the component of movement which is the larger.

The means for gating the spindle pulse train on line 22 from the circuit 19 and the pulse train from the multiplier circuit 21 to selected ones of the terminals 15, 16 of the servo systems A, B will now be described. The pulses from the pulse divider 19 appear on line 20 and 20 is connected to the input of two servo AND gates 40, 41 for gating pulses to the servo systems A, B, respectively. During operation one or the other of the gates 40, 41 is open to apply the pulses from the divider 19 to a selected servo system. If the gate 40 is open to apply the pulses to servo system A, the pulses from gate 40 are applied to a line 42 which is connected to an input to direction and gates 43, 44. If the direction gate 43 is open, the pulses appear on an output connection 43a from gate 43 and are applied to the input terminal 15 of the servo system A through a blocking AND gate 46. If the gate 44 is open, the pulses appear on an output connection 44a and are applied to the input terminal 16 of the servo system A through a blocking AND gate 47.

If the AND gate 41 is open the spindle pulse train on line 20 is applied to the servo system B. The pulses appear on an output connection 41a from the gate 41 and are applied to one input of each of the direction gates 48, 49. If the gate 48 is open, the pulses appear on an output connection 48a and are applied to the terminal 15 of the servo system B through a blocking AND gate 51; and if the gate 49 is open, the pulses appear on an output connection 49a and are applied to the servo system B at terminal 16 through a blocking AND gate 52.

From the foregoing, it can be seen that the spindle pulse train on line 20 may be applied to any one of the terminals 15, 16 depending upon the condition of the gates. This is also true of the pulse train from the binary multiplier 21 appearing on line 22. Line 22 is connected to the input of servo AND gates 54, 55. If the gate 54 is open, the pulses on line 22 are applied to the line 42 and thence to either the terminals 15 or 16 through the direction AND gates 43, 44 and if the gate 55 is open, the pulses are applied to line 41a and hence to an input for each of the direction gates 48, 49 for the servo system B and from these gates to either the terminal 15 or 16 of the servo system through the blocking gates 51, 52. It can be seen, therefore, that by opening and closing the gates 40, 41, 54, 55, it can be determined to which of the systems that the respective pulse trains are applied and by operating selected ones of the direction gates 43, 44 and 48, 49 the direction of the operation of the servo system in response to the pulses is determined.

The gates 41, 54 are each opened to pulses by applying a particular voltage to an input thereof connected to a common line 60 and the gates 40, 55 are opened by applying a particular voltage to an input thereof connected to a common line 61. If the proper voltage is applied to the line 60, the gates 54, 41 are opened and the spindle pulse train on line 20 is applied to servo system A and the pulse train from the binary multiplier 21 on line 22 is applied through the gate 41 to the servo system B. If the voltage is applied to the line 61, the connections to the systems are reversed. The voltages on lines 60, 61 are determined by a binary element which constitutes one stage of the register 25 associated with the binary multiplier.

The number of pulses applied to the servo systems A and B are determined by the binary number preset in the displacement registers and counters 30, 31, respectively. The logic for the preferred form of the register and counter 30 is shown in FIG. 3 and as shown therein the displacement register and counter 30 comprises a series of stages 62a, 62b . . . 62m comprised of binary elements 62 capable of assuming either one of two mutually exclusive states, arbitrarily designated as 1 and 0 and are preferably bistable multivibrators connected to form a counting chain for pulses on a line 78 which is connected to the stage 62a so that the pulses are applied to effect a change of state for each applied pulse.

Each of the binary elements 62 have a presetting connection 63 thereto which set the binary element to its 1 state, if not already therein, when a pulse is applied to the connection. The connections 63 are output connections from respective AND gates 64 which perform the logical AND function. The AND gates 64 each have one input connected to a common transfer line 65 and a second input controlled by a corresponding binary state of a shift register 66 and is connected to the corresponding stage by a connection 67.

The shift register 66 is comprised of binary stages 66a . . . 66 corresponding in number to the stages of the counter and register 30 plus one. Each stage is comprised of a binary element 73 adapted to assume either of two mutually exclusive states to register the digits 1 and 0.

When the corresponding stage of the shift register has the digit 0 registered therein the corresponding gate 64 is conditioned to pass a pulse on line 65 to trigger the corresponding stage of the register and counter 30 to a 1 condition.

The shift register 66 will not be described in detail since shift registers are well known in the art. Such registers, however, include a shift connection 74 to which a pulse can be applied to shift the digit in each stage to the following stage of the register. In the shift register 66 the digits of a binary coded number appearing serially on line 75 are applied to the stage 66a to change its state each time a pulse is applied thereto. After the appearance of each binary digit or bit, 0 being represented by the lack of a pulse and 1 by the presence of a pulse, the shift connection 74 is pulsed to shift the digits of the register to the following stage. The shift pulse always returns the first stage 66a to 0 condition since the stage responds to a shift pulse as if it followed a stage having 0 set therein. This sequence is repeated until the number to be set in the register has been applied to the stage 66a and shifted into the stages where it is to be registered.

It will be noted that the shift register 66 has one binary stage greater than the number of binary stages in the displacement register. The binary stage 66a is utilized to control the direction of movement along the X axis, as will be explained hereinafter.

When a number has been registered in the shift register, the gates 64 are conditioned to transfer the number set in the shift register to the displacement register and counting circuit 30 and do so when a pulse appears on transfer line 65. It will be recalled that when a 0 is set in any of the binary stages 66b . . . 66 a gate conditioning voltage appears on the corresponding input line 67 to the corresponding gate 64. Therefore, when a pulse appears on the line 65, it will be passed by all gates for the stage of the shift register 66 which have a 0 and will trigger the corresponding binary element in the displacement register and counter to a 1 condition. It will be noted that this transfers the binary complement of the binary number set in the shift register rather than the binary number itself. If the displacement register and counter 30 is now pulsed over input line 78 until the register fills to capacity and all the binary elements return to the 0 condition, a number of pulses will have been applied corresponding to the complement of the number originally set in the shift register 66 plus one. The displacement register, at this time, provides a pulse signal on a connection 82 connected to the most significant binary digit of the displacement register and counter 30. The connection 82 is connected to the most significant binary stage 62m so that a pulse appears thereon when the most significant binary stage 62m, the left-hand one as viewed in FIG. 3, is triggered from its 1 state to its 0 state.

In operation, the register and counter 30 counts the pulses applied to the A servo system. Inasmuch as it is desirable that the completion pulse on line 82 occur after the counter counts the complement of the number originally set in shift register 66 rather than the complement plus one, the transfer pulse which effects the setting of the displacement register and counter 30 is also applied to trigger a monostable multivibrator 83 to its unstable state and to provide a delayed pulse on a connection 83a upon its return to its stable state which is applied to the input line 78 of counter 30 to add a count of one to the number set therein.

The input pulses to the line 78 of counter 30 are derived from either the connection 43a or the connection 44a. To this end, the input connection of the register and counter 30 constitutes the output connection of an AND gate 84 having a first input connection 85 connected to the output of an OR gate 86 which in turn has inputs connected to the connection 43a and the connection 44a which apply pulses from the direction gates 43, 44 to the terminals 15, 16 of servo system A through the AND gates 46, 47, respectively. Whenever a pulse appears on either of the connections 43a, 44a, the OR gate 86 transmits a voltage pulse to one input of the AND gate 84. The second input to the AND gate 84 is controlled by a binary element 88, preferably a bistable multivibrator circuit or flip-flop which is capable of assuming either one of two mutually exclusive states and which has a connection 89 on which relatively high and low voltages appear for the respective 1 and 0 states of the binary element. When the voltage on the connection 89 is relatively high, the AND gate 84 is conditioned to pass pulses on either line 43a or 44a to the register and counter 30. The connection 89 of flip-flop 88 is also connected to the blocking AND gates 46, 47 to condition the latter to pass the voltage pulses appearing on either the line 43a or 44a to the servo system A. The connection 82 of the displacement register and counter circuit upon which the completion signal appears is connected to the flip-flop 88 so that the pulse signal on the connection 82 when the register and counter 30 fills to capacity, will trigger the flip-flop 88 to a condition where a voltage appears on the connection 89 so that the gates 46, 47 and 84 are closed. The flip-flop 88 is triggered to its other state to open the gates by a voltage pulse on a connection 90, the connection 90 being an output connection from a monostable multivibrator circuit 91, a pulse appearing on connection 90 when the circuit 91 flips from its unstable to its stable state. The monostable multivibrator circuit 91 is triggered to its unstable state by a pulse appearing on a connection 92 which is connected to the transfer line 65 so that a pulse appears therein each time the gates 64 are pulsed to transfer the binary complement of the binary number in the shift register 66 to the displacement register 62. The pulse appearing on connection 92 triggers the multivibrator 91 to its unstable state and on the return to its stable state, a pulse appears on the output connection 90 from the multivibrator 91, the latter pulse triggers the binary element 88 to its condition where a voltage appears on connection 89 to open the gates 84, 46, 47 to pulses on lines 43a, 44a.

A pulse for effecting the transfer of a complement number from the shift register 66 to the register and counter 30 will, therefore, open the blocking gates to allow pulses to pass to the servo system A, as well as opening gate 84 to apply pulses to the counter 30.

As stated above, the least significant binary 66a of the shift register 66 controls which one of the direction gates 43, 44 is opened. If the binary element 66a is in one state, a signal voltage appears on an output connection 95 and if in its other state, a signal voltage appears on an output connection 96. The connections 95, 96 are applied to first inputs of respective AND gates 97, 98 each having second inputs connected to the transfer line 65 so that when the transfer voltage pulse appears on the transfer line 65, the pulse will be passed through the particular one of the gates 97, 98 which is conditioned to pass the pulse. The gates 97, 98 have output connections or lines 99, 100, respectively, which are connected to a binary element or flip-flop 102 capable of assuming either one of two states. When a voltage appears on the line 99, the binary element or flip-flop 102 is triggered to one of its states, if not already in the state, and when a voltage appears on the line 100, the binary element 102 is triggered to its other state, if not already in that state. Output connections 103, 104 are provided from the binary element 102 so that when a signal on the line 99 sets the flip-flop in the corresponding state, the level of the voltage on the output connection 103 conditions the gate 43 to pass pulses to the servo system A to operate the latter in a positive direction and when a signal on the connection 100 sets the flip-flop 102 in the corresponding state, a signal appears on the connection 104 to condition the gate 44 to pass pulses on the line 42 to apply pulses to the negative input of the servo system A.

From the foregoing, it can be seen that a number representing a desired displacement in a predetermined direction may be applied serially to the input connection of the shift register 66 and the complement thereof plus one transferred to the displacement register and counter 30 by pulsing the transfer line 65. The pulsing of the transfer line 65 also effects the setting of the binary element 102 to condition the direction gates 43, 44 to pass pulses in the direction corresponding to the digit registered in one stage of the shift register 66 as well as effecting the opening of gates 84, 46 and 47 to pass pulses to the servo system A and to the counter 30. As pulses appear on either the line 43a, 44a, the pulses are applied to the input of the displacement register and counter 30 through the gate 84 and when the register fills to capacity, a pulse signal appears on line 82 which closes the gates 46, 47 and the gate 84 by resetting the binary element 88.

The Y displacement register and counter is the same as the X displacement register and counter and has associated therewith a shift register 107, which corresponds to the shift register 66, having shift and input connections 105, 106, respectively. The shift register is adapted to register a binary number appearing on the input line 106 whose binary complement is to be transferred to the displacement register and counter 31 when a pulse is applied to a transfer line 107a as well as a binary digit which is effective to set a bistable binary element or flip-flop 108, which corresponds to the binary element or flip-flop 102, to a state which depends upon the digit registered in response to a pulse on the transfer line 107a, the binary element 108 being connected to condition the direction gates 48, 49 to pass or block pulses in accordance with the state of the binary element 108 and in the same manner that the binary element 102 conditions direction gates 43 and 44.

When a transfer pulse is applied to the connection 107a, a pulse appears on a line 111 connected to a monostable multivibrator 112 and a delayed pulse is applied to the input of counter 31 as in the case of counter 30. The pulse appearing on line 107a is applied to the monostable multivibrator 112 so that it triggers the multivibrator from its stable state to its untable state. When the multivibrator 112 returns to its stable state, an output pulse appears on a line 113 to trigger a bistable binary element 114 to a particular one of its states. The binary element 114 is preferably a bistable multivibrator or flip-flop and corresponds to the binary element 88 and controls the gates 51, 52 and when in the state to which it is set by a pulse on the line 113, the voltage on a connection 116 connecting the flip-flop 114 and the blocking gates 51, 52 is at a level which opens the gates to pulses from the gates 48, 49 to pass the pulses to the servo system B. The flip-flop 114 also has a connection 118 thereto which resets the flip-flop to its opposite state from the state to which it is set by a pulse on line 113, and when the flip-flop 114 is in the opposite state, the voltage on line 116 is such as to close the gates 51, 52 to block pulses to the servo system B. The line 18 corresponds to the connection 82 of the displacement register and counter circuit 30 and effects closing of the gates 51, 52 when the counter 31 fills to capacity. The Y command pulses which are applied to gates 51, 52 over connections 48a, 49a are also applied to an input connection 119 for the displacement register and counter 31 through an OR gate 120 and an AND gate 121. The AND gate 121 is conditioned to pass the pulses by the voltage which appears on output connection 116 from the binary element 114 to open the gates 51, 52 and which is connected to one of the inputs of the AND gate 121 in addition to being connected to the gates 51, 52.

As in the case of register and counter 30, the Y register and counter 31 has a multivibrator 122 associated therewith which is triggered by the pulse on transfer line 107a to issue a delayed pulse which is applied to the input of the counter.

The binary multiplier 21 has a shift register 125 associated therewith which corresponds to the shift register 107, 66 associated with the displacement register and counting circiuts 31, 30 respectively. The binary coded number representing the factor by which the pulses from the spindle are to be multiplied by the circuit 21 appears serially digit by digit, or bit-by-bit, on an input connection 126 for the shift register. Each digit on line 126 is registered as a 1 or 0 in the first stage and after each digit a shift pulse is applied to a shift connection 129 to shift all digits in the register to the next order of the register and to return the first stage to 0. The register 125, is comprised of a series of binary elements 128 providing register stages 125a–125n, each having arbitrarily designated 1 and 0 states, and with element of each stage being connected to the element of the following or higher stage by a connection including a monostable multivibrator 129. The monostable multivibrators 129 receive a triggering pulse from the preceding stage when it passes from 0 to 1 and emit a delayed pulse to set the following stage to its 1 condition. The shift signal appearing on the line 127 is connected to each of the binary element 125a–125n through a respective OR gate 130, and is effective to reset the binary element to which it is applied to its 0 condition, if not already in the 0 condition, and those which are reset to 0 will issue a pulse to the corresponding multivibrators 129. The length of the shift pulse is such that it will be terminated before the pulses from the multivibrators 129. Therefore, the multivibrators 129 will be effective to insert a 1 in the corresponding higher stage when the corresponding lower stage had a 1 therein at the time of the application of the shift pulse. The OR gates 130 have second inputs connected to a transfer line 131 which is pulsed to effect a resetting of the binary elements to 0. The resetting is accomplished by applying a pulse which has a time length greater than the time from the application of the pulse until the end of the delay pulse from multivibrators 129 when they are triggered by the return of the preceding stage to 0. Each of the binary stages 125a–125n also has an output connection 132 upon which a relatively large voltage appears when the corresponding binary element is in its 1 condition, and a relatively small voltage when it is in its 0 condition. Each connection 132 is connected to one input of a corresponding AND gate 134 with each of the second inputs of the AND gates 134 being connected to a common transfer line 135 which is pulsed to transfer the number registered in the shift register 125 to the register 25 having bistable binary elements 136 providing stages 136a . . . 136k corresponding in number to the number of binary stages 125b . . . 125k in the shift register. There being no stages in the illustrated embodiment, in the register 136 which correspond to the stages 125l, 125m, 125n in the shift register. The binary stages of the storage register 25 are adapted to control a series of AND gates 137b . . . 137k. The AND gates 137b . . . 137k have first inputs connected to corresponding binary stages of the register 25 by respective connections 138 so that when the corresponding stage is in a 1 condition, a voltage appears on the corresponding connection 138 which conditions the corresponding gate to pass pulses applied to the gates over second input connections 139b . . . 138k. The connections 138b . . . 138k are connected to corresponding binary stages of a counting circuit 140, the binary stages being designated by the reference numerals 140k to 140b and each of the binary stages corresponds to one of the gates 137b . . . 137k. The connections 139b . . . 139k are connected to the corresponding ones of the binary stages 140b . . . 140k so that when the stage is triggered from a 0 condition to a 1 condition, a pulse appears on the corresponding one of the output connections 139b . . . 139k. The pulses from the general divider 19 appearing on line 20 are applied to the input or least significant binary stage 140k to trigger or change its state whenever a pulse is applied thereto, and it will be understood by those skilled in the art that after one pulse an output pulse appears on line 139k, after two pulses an output pulse appears on line 139j, after four pulses an output pulse appears on line 139i, etc. The pulses which appear on the lines 139b . . . 139k are passed to the output connection 22 if the corresponding one of the gates 137b . . . 137k are opened. The gates 137b . . . 137k each have output connection 142 which are connected through rectifiers to the common output line 22 and the number of the pulses appearing on the line 22 is the summation of the pulses passed by the gates which are opened in accordance with the number stored in the register 25.

In the preferred binary multiplier, the binary elements 140k . . . 140b are each interconnected to the following element by a carry connection, the carry connections being designated by the reference numerals 141. A pulse appears on each carry connection when the preceding binary element is triggered from a 1 condition to a 0 condition. It will be noted that since the connections 139k . . . 139b are connected to their corresponding binary elements so that they receive a pulse when the binary element is triggered from a 0 condition to a 1 condition, it being arbitrarily assumed that all binary elements are in their 0 condition before the application of any input pulses to the counter, the first pulse applied to the counter 140 will trigger the binary element 140k to its 1 condition to effect a pulse on the output connection 139k and that thereafter every second pulse applied to the input element 140k will cause the appearance of a pulse on the output connection 139k. The second pulse applied to the input binary element 140k will cause a carry pulse to appear on the corresponding carry connection 141 and will trigger the binary element 140j from its 0 condition to its 1 condition and an output pulse will appear on the connection 139j to the gate 137j and that thereafter every fourth pulse applied to the input of the binary element 140k will cause a pulse to appear on the connection 139j. The frequency of the pulses appearing on connections 139k, 139j . . . 139b are, respectively, $f/2$, $f/4$, $f/8$, etc., while the number of pulses appearing on the connections 139k . . . 139b for N input pulses corresponds to $(N+1)/2$, $(N+1)/4$ . . . $(N+1)/1024$.

When the output connections 139k . . . 139b and the carry connections 141 receive pulses when the corresponding binary element for each is triggered to a different one of its states, the pulses appearing on the output connections 139k . . . 139b are always displaced in time without the use of delay elements. It will be readily appreciated that if pulses occurred simultaneously on any of the connections 139k . . . 139b, some means would have to be provided to separate the pulses before being applied to the output line 22. In the described binary multiplier this is not necessary.

The bistable binary element of stage 136a of the register 25 does not control a gate for gating pulses to the line 22, but controls the gates 40, 41 and 54, 55. The binary element has two output connections 143, 144 connected to lines 60, 61, respectively, and when the element is in one state, a voltage appears on line 143 to condition the gates 41 and 54 to pass pulses to their respective servo systems and when the element is in its other condition, a voltage appears on line 144 to condition gates 40, 55 to pass pulses to the servo systems A, B. It will be recalled that when gates 40 and 55 are open, the pulses from the spindle are applied to the servo system A and the pulses from the binary multiplier 21 are applied to the servo system B; when the gates 41, 54 are open, the connections are reversed.

The displacement registers and the binary multiplier are set by the tape reader 28 which is adapted to read the tape 27 and provide a serial output on the input line 126 to the shift register 125 and the input lines 75, 106 to the shift registers 66, 107 associated with the displacement register and counters 30, 31. The tape 27 read by the tape reader 28 has a series of orders thereon comprising binary words arranged lengthwise of the tape in columns, as is shown in FIG. 4. One of the columns represents the digits or bits of the word to be set in the X shift register 66, one of the columns includes the word to be set in the Y displace shift register 107 and the other column includes the word to be set into the shift registers 125. The details of the tape reader are not shown in the present application since tape readers of the type for reading words serially and providing binary coded trains which represent the number in a serial fashion are well known. The tape reader 28 is shown schematically and as indicated in the drawings generally comprises a pulse generator 145, which may be a twenty-cycle-per-second oscillator, which is utilized to pulse a reader coil 146. The oscillator 145 is connected to the reader coil 146 through an AND gate 147 and an amplifier 148. When the AND gate 147 is opened the reader coil 146 is pulsed and a one revolution clutch 149 is actuated for each pulse to connect a motor 151 to advance the tape one revolution so that to position the reader to read the next transverse row on the tape. The reader may comprise a plurality of pins or other reading elements, such as photoelectric cells, for sensing the opening in the tape columns one row at a time and is advanced one row each time the one-revolution clutch is actuated. The one-revolution clutch drives a cam 152 and when the clutch is in its stop position the cam actuates a switch 153 which closes contacts to the input lines to the shift registers. If an opening appears in the tape in the corresponding column of the row being read, a pulse representing a 1 appears on the output line, and if no opening appears, no pulse, representing a 0, is on the output line.

The one-revolution clutch, therefore, operates the reader to advance the tape to read the rows of the tape, twenty rows during each second, if the oscillator 145 is a twenty-cycle oscillator, and the relay coil 146 will be actuated twenty times during a second. The output of the twenty-cycle oscillator 145 is also applied to trigger a monostable multivibrator circuit 154 to trigger the latter from its stable condition to its nonstable condition. Upon the return of the multivibrator 154 to its stable condition, a pulse appears on an output connection 155 which is applied to the shift connections 127, 105, 74 of the shift registers 125, 107, 66, to shift the registers during the advancing of the tape to effect a shifting of the registers after the next row is read.

The gate 147 is opened to effect the periodic advancing of the tape by applying a voltage to a second input of the gate simultaneously with the application of the output of the oscillator 145 to the first input of the gate. The voltage for conditioning the gate to pass the oscillator pulses is applied over a line 156 which is connected to the output of an AND gate 157 having two inputs to which connections 158, 159 are connected. When a predetermined voltage is applied to both the connections 158, 159, the gate 157 is opened to apply voltage to the line 156 which conditions the gate 147 to pass pulses from the oscillator 145. The necessary voltage appears on the connections 158, 159 when bistable multivibrator circuits, or flip-flops 160, 161, are in predetermined states, which states shall be arbitrarily designated as their 1 states. The connections 158, 159 are connected to the flip-flops 160, 161, respectively, and the flip-flops 160, 161 are set respectively to their 1 state by pulses applied over input connections 162, 163, respectively. When pulses appear on the connections 162, 163, the circuits 160, 161 are set to their 1 condition and the gates 157, 147 are opened. The flip-flops 160, 161 may be reset to their zero states by a pulse appearing on a common connection 165.

The connection 162 is connected to receive a pulse from monostable multivibrator 83, when the latter returns from its unstable state to its stable state. The multivibrator 83, as described hereinbefore, is connected to be triggered to its unstable state in response to a pulse on the transfer line 65 so that when a pulse is applied to the transfer line to effect the setting of the register and counter 30, the monostable multivibrator will be triggered to produce a delayed pulse on the connection 162 to set the flip-flop 160 in its 1 condition to condition the gate 147 to pass pulses from oscillator 145 if the flip-flop 161 is also in its 1 state. It will be noted that both flip-flops 160, 161 must be in their 1 condition to open gate 147. The flip-flop 161 is set to a 1 state by a pulse from shift register 125 when the latter is reset to zero and both of the flip-flops 160, 161 are reset to their 0 condition to close the gate 147 to stop tape advance by a pulse appearing on a line 166 connected to each of the flip-flops 145, 146 and to the shift register circuit 125. The stop tape pulse on line 166 is derived from the final stage of the shift register 107 and the word on the tape to be shifted into the shift register 125 is provided with a mark which constitutes the first bit or digit read by the tape reader and which, when shifted through the register effects the stop tape pulse. Inasmuch as the shift registers 66, 107 require, in the illustrated embodiment, fifteen bits for each word, and the register 25 associated with the binary multiplier 21 only has eleven stages, the shift register 107 is provided with three additional stages over that required for setting the associated binary multiplier register 25. This prevents the first bit read by the tape reader in each group from being shifted out of the shift register to stop tape advance before the other shift registers are set. Referring to FIG. 1, it will be seen that the line 166 is connected to the last stage of the shift register. The connection is such that a voltage will appear on the line 166 to reset the flip-flops 160, 161 to their 0 condition in response to the shifting of the 1, read as the first bit by the tape reader, out of the last stage of the shift register 107.

In the case of the shift register 107 and the storage register 25 associated with the binary multiplier 21, it is necessary to reset these registers to zero each time a new number is to be set therein. In the case of the shift register 107, this is necessary because the tape advance is stopped by a shifting of a 1 into the last stage of the register and this would occur prematurely if the initial condition of the shift register were not zero at the time that the first bit of the new number is read into the regiser. In the case of the storage register 25, the register is not returned to zero by any counting action as is the case with the registers and counters 30, 31 and, therefore, must be reset before it receives a new number from the shift register 107.

In the illustrated and preferred embodiment, the completion signal produced on line 82 when the register and counter 30 fills to capacity and returns to zero is used to reset a bistable binary element which comprises a bistable multivibrator 167 to a particular state which shall be arbitrarily designated as its 1 state, the other state being designated as its 0 state, and the corresponding signal from the Y displacement register and counter 31 is utilized to set a corresponding binary element comprising a bistable multivibrator 168 to a corresponding 1 state. The bistable multivibrators 167, 168 control an AND gate 169. When the multivibrators are triggered to their 1 state, an output pulse appears on a respective line 170, the respective lines 170 being connected to the two inputs of the AND gate 169 which has an output connection 171. A pulse appears on the output connection 171 when corresponding pulses from the bistable multivibrators 167, 168 appear simultaneously on the output connections 170. The connection 171 is connected to each of the transfer lines 65, 107a, these latter lines including monostable multivibrators 171a for delaying pulses which appear on the line. A pulse on the connection 171 will, therefore, with a delay be applied to effect a setting of the registers and counters 30, 31. The connection 171 is also connected to a line 172 connected, in turn, to each of the stages of the storage register 25 so that a pulse on the line 171 will trigger the stages from the 1 condition to their 0 condition if the respective stages are not already in their 0 condition. This resets the storage register 25. The line 171 is also connected to trigger a monostable multivibrator 173 which applies a delayed pulse over a line 174 to the AND gates 134 interconnecting the stages of the shift register 125 and the storage register 25 to effect a transfer of the number registered in the shift register 125 to the storage register 25. The output pulse from the monostable multivibrator 173 appearing on the ouput line 174 connected to the gating line 135 is also applied to a second delay means 175 comprising a monostable multivibrator having an output connection 176 upon which a delayed pulse occurs, the pulse on line 176 occurring upon the return of the multivibrator 175 from its unstable to its stable state. The line 176 is connected to each of the stages of the shift register 125 through the OR gates 130. The OR gates were described hereinbefore and it will be recalled that the shift pulse for register 125 is applied to one input thereof and the gates are connected to the corresponding stages of the register 125 so that the corresponding stage is triggered to its 0 condition by a pulse applied to the OR gate. As previously mentioned, the pulse appearing on the output connection 176 for resetting register 125 to zero is longer in time than the delayed pulse which is produced by the monostable multivibrators 129 interconnecting the stages of the register when the preceding stage goes from 1 to 0 in response to a pulse applied through the OR gate. Since the pulse appearing on line 176 is longer in time, the monostable multivibrators will not trigger the following stage to a 1 condition when the preceding stage was in a 1 condition prior to the application of the pulse from the monostable multivibrator 168 through the OR gates 130.

The line 176 from delay means 175 is also connected to the connection 163 to flip-flop 161 and effects setting of the latter to its 1 state to effect tape advance provided the flip-flop 160 has been triggered by a pulse from the register counter 30.

It can now be seen that tape advance is initiated when a first pulse has set flip-flop 160 to its 1 condition, the pulse occurring when the number in shift register 66 has been transferred to the register and counter 30 and when the flip-flop 161 has been set to its 1 condition by a second pulse indicating that the shift-register 125 and storage register 25 have been reset to zero, the tape advance being stopped in response to a 1 being shifted into the last stage of the register 125 which indicates that all of the shift registers have set.

In the foregoing specification, reference has been made to binary elements which have 0 and 1 states and which are caused to assume particular ones of these states by the application of a pulse, or which are caused to assume alternately one state and then the other, by the application of successive pulses. It is not considered necessary to disclose the details of the binary elements, insofar as those skilled in the art are concerned. Such elements are conventional elements and may be comprised of circuits which use magnetic cores, transistors, or vacuum tubes, as well as other conventional circuit elements, such as relays. Those skilled in the art are familiar with the manner in which a pulse or a voltage must be applied to a binary element to effect a change of state regardless of the particular state that it is in, or to effect a change of state only if the element is not in the desired state. While the binary elements are considered conventional and well understood by those skilled in the art, FIG. 5 is a circuit diagram of a bistable multivibrator which can be used as a binary element. The circuit, as shown, comprises tubes 190 and 191 having their grids interconnected to provide a bistable multivibrator circuit. Conventionally, the multivibrator is considered to be in a 0 state when one of the tubes is conducting, for example, tube 190, and in its 1 state when the tube 191 is conducting. If negative pulses are applied directly to the grids of either one of the tubes, that tube, if conducting, will cease to conduct and the circuit will change its state. If the tube is not conducting there will be no change of state. Consequently, if it is desired to apply a pulse to the multivibrator circuit shown in such a manner that the pulse will have no effect on the circuit if the circuit is in its 1 state but will trigger the circuit to the 1 state if in its 0 state, the pulse can be applied to a terminal 192 connected to the grid of the conducting tube in the 0 condition, i.e., tube 190, to effect the desired action.

If a negative pulse is applied through symmetrical circuits to both of the grids of the tubes, the binary element will change its state, regardless of which tube is conducting. Therefore, the illustrated binary can be made to change state by applying a negative pulse to a terminal 193. If it is desired to obtain an output from the multivibrator which has a relatively high level when the tube 190 is nonconducting, i.e., when the binary is in its 0 state, and a relatively low level when the 1 tube is conducting, a connection may be made to terminal 192 connected to the grid of the tube 190. If it is desired to obtain an output from the multivibrator which has a relatively high level when the tube 190 is nonconducting, i.e., when the binary is in the zero state, a connection may be made to terminal 192. When the binary is in the one state, the potential of terminal 192 is relatively low. Such a connection may be made when the binary element is used for supplying high and low potentials for an AND gate. Similarly, a connection may be made to a terminal 194 connected to the grid of the tube 191 if the relatively high voltage is to be obtained when tube 191 is conducting, and to a terminal 191a if the high voltage is to be obtained when tube 190 is conducting.

If it is desired to derive a negative pulse on a connection from the binary element when the element shifts from a particular state to its other state, the connection can be capacitively coupled to the grid of the tube which is conductive when the binary element is in the particular state. The grid of this tube is then positive and will go negative when the triggering occurs. This is the manner that carry pulses in counting circuits may be derived and pulses for triggering the monostable multivibrators interconnecting stages of shift register may be obtained.

For a further discussion of the circuits which are adapted to function as binary elements and for binary circuits connected as counters and shift registers and for a discussion of AND and OR gates, reference is made to "Pulse and Digital Circuits" by Millman and Taub, a McGraw-Hill publication, published in 1956. With respect to the AND and OR circuits mentioned above, it is to be understood that an AND circuit passes a voltage or pulse when two similar voltages or pulses having a predetermined characteristic or magnitude are applied thereto, and an OR circuit will pass a voltage or pulse in one direction when the pulse or voltage appears on any of the input connections thereto. Reference is also made to my copending application Serial No. 655,764, filed April 29, 1957, now issued as Patent No. 2,922,940, for a more detailed description of binary elements and circuits which function as switches, counters and AND gates.

It is not considered necessary to describe the servo systems A and B in detail. Servo systems using bidirectional error counters are well known to those skilled in the art and, therefore, only the features of the servo systems which are considered to be new will be described. The further description of the servo systems will be made with respect to system A, but the elements of system B will be given the same reference numerals. As shown in FIG. 1, the servo system A includes a bidirectional counter 200 including add and subtract terminals 201, 202 respectively, to which add and subtract pulses appearing at terminals 15, 16 respectively are applied through respective OR gates 199. The bidirectional counter sums the pulses and has an output which is indicative of the difference of the number of pulses received by the counter over the respective input connections thereto. The difference number of the reversible binary counter appears in binary coded form on output lines 203 each representing a digit of the binary number and having two potential levels representing 0 and 1 respectively. The output connections of the reversible binary counter are connected to a digital-to-analogue converter 209 which provides an output voltage at output terminals 204, 205, which is the analogue of the binary number at the output of the reversible counter.

In the preferred embodiment, the output of the digital-to-analogue converter 209 is compared with a reference voltage by means of a chopper 206 having a movable, make-and-break arm 207 connected to the input of an amplifier 208. The arm 207 alternately engages contacts 210, 211 of the chopper and the output connection of the digital-to-analogue converter is connected to the contact 210, while the contact 211 is connected to a voltage reference circuit 213 for providing the reference voltage. The reference voltage is selected so that the reference voltage is equal to the voltage from the digital-to-analogue converter when the bidirectional counter has a number therein representing an excess of pulses received over the add line and having a magnitude such that during the normal operation of the system, the pulses received at either terminal never exceed the pulses received at the other terminal line sufficiently to drive the counter to zero or to capacity; consequently, the counter never counts through zero.

The arm 207 of the chopper 206 is connected to the A.C. amplifier 208. If the reference voltage and the voltage from the digital-to-analogue converting circuit are the same, the output of the amplifier is zero and if the reference voltage is larger than the digital-to-analogue converting circuit, the chopper produces a square wave of a magnitude corresponding to the difference of the voltage and of one phase which is amplified by the amplifier 208 to provide an A.C. output signal of a first phase; and if the output voltage of the digital-to-analogue converting circuit is larger than the reference voltage, a corresponding square wave will be produced by the chopper which will be 180° out of phase with the wave produced when the reference voltage is larger and the output of the amplifier will likewise be 180° out of phase with that produced when the reference voltage is larger. It can be seen therefore, that when the difference number in the counter 200 is below the zero number which has an analogue, the output of amplifier 208 is of one phase and when above is of the opposite phase and has a magnitude which is dependent on the difference between the difference number on the register to the zero number.

The output of the amplifier 208 is connected to a conventional servo motor 218 which is responsive to the phase of the input signal to determine the direction of operation of the motor and to the magnitude to determine the rate of motor operation. The servo motor 218 drives the corresponding lead screw and each corresponding lead screw drives a motion transducer or digitizer 219 which produces pulses on a line 220 when the screw rotates in one direction, and on a line 221 when the screw rotates in the other direction, each pulse representing a unit angular displacement. The lines 220, 221 are connected to the add and subtract terminals 201, 202, respectively, of the bidirectional counter 200 through the OR gates 199, to supply pulses to the other terminal than the one to which the command pulses are applied when the motor is operating in the corresponding direction. If the command pulses are being supplied to the add terminal 201 to command operation in one direction, the pulses from the digitizer are supplied to the subtract terminal 202 for the corresponding direction of movement, and to the add terminal for movement in the opposite direction. It can now be seen that the servo motor will operate to "zero" the counter 200 at the number where the reference voltage equals the output voltage from the converter 209. If the voltage from the converter differs from the reference, the error signal at the output of the A.C. amplifier will operate the servo motor in the proper direction to pulse the proper terminal to add or subtract counts to the number in the counter until the latter reaches the "zero" number. It can also been seen that when the counter is at its zero number, the application of command pulses to different ones of the add and subtract terminals will effect operation of the servo motor in different directions. While the rate of movement at any particular instant depends upon the difference number in the bidirectional counter, the average velocity of the servo system is actually a function of the frequency of the applied command pulses.

The divider or multiplier circuit 19 which receives the pulse train from the spindle pulse generator has not been shown or described in detail. The divider circuit, however, may be similar to the binary multiplier 21 and may have a plurality of binary stages 235 connected to form a counting chain with a connection 236 to each stage that receives a pulse when the stage passes from a 1 to a 0. The pulse from each stage may be applied to a corresponding gate 237 which is conditioned to pass or block the pulse to or from line 20 in accordance with the setting of a corresponding switch 238 operated by the control knob 21.

While the multiplier or divider circuit 19 is illustrated as being manually set, it will be understood that the circuit could be provided with a storage register similar to the storage register 25 of the binary multiplier 21 and adapted to be set by intelligence on the tape. It is to be understood, however, that the multiplier or divider circuit 19 is normally set to multiply by a given factor for a series of successive movements where the motion along the X axis is to be larger for some and smaller for other resultants than the motion along the Y axis.

It will also be understood by those skilled in the art that the system could be operated with a single displacement register and counter. In the described system, the displacement register and counter 31 counts the pulses being applied to the Y axis and the circuitry associated therewith determines the direction of operation of the Y servo motor by controlling the direction gates.

Inasmuch as the motions along the X and Y axes are effected at coordinated rates so that the desired displacement along the Y axis is accomplished in the same period of time that it takes to accomplish the desired motion along the X axis, it is only absolutely necessary to count the pulses applied to one of the axes. When the desired displacement along this axis has occurred, the related pulse train effecting motion along the other axis will have effected the desired movement along that axis and, therefore, the completion signal from the displacement register and counter can be utilized to close the gates to both the A and B servo systems. If the displacement register and counter 31 is eliminated the directional gates for the servo system B can be controlled by a stage in the shift register for the binary multiplier or by other stages in the shift register for the displacement counter and register 30.

If one displacement register and counter is utilized, the displacement register and counter is preferably used to count the pulses applied to the axis to which the fast pulse train is applied. Inasmuch as the fast train might be applied to either the A or B servo system, switching means must be provided for applying the pulses of either servo system to the counter, depending on which of the servo systems the fast pulse train is being applied to. FIG. 6 is a logical diagram of such a switching system.

Referring to FIG. 6, the parts corresponding to the parts of FIG. 1 have been given the same reference numerals and the displacement register and counter 30 is used to count the pulses applied to one of the servo systems, the displacement register and counter 31 being eliminated. The tape for controlling the system is coded so that for each order thereon, the number set in the shift register 66 and subsequently the displacement register 30 represents the movement along the axis along which the larger movement is to occur. The tape is also coded to indicate along which of the axes the larger movement is to occur as in the first embodiment. It will be recalled that the stage 136a of the binary multiplier is set to a value indicating whether the movement along the X or the Y axis is larger and that the setting of this stage controls potentials on lines 143, 144, to condition the gates 40, 54, 41, 55 to determine to which of the axes the fast and slow trains are applied. The conductors 143, 144 may also be connected to a bistable multivibrator or flip-flop 225 to set it to a state determined by the setting of stage 136a to control which of the pulse trains are applied to the input of the counter 30. The binary element 225 controls AND gates 226, 227 connected to the output of OR gates 86, 170 of the first-described embodiment, the OR gates having inputs connected to the lines 43a, 44a and lines 48a, 49a, respectively, connected to the gates 46, 47, 51, 52.

When the binary element or flip-flop 225 is in one of its positions to which it is actuated by the voltage on line 144 when the X movement is larger, the gate 226 is opened so that the pulses applied to the servo system A also appear at the output 228 of the gate 226 and, if the flip-flop 225 is in its state to which it is actuated by the voltage on line 143 when the Y movement is larger, the gate 227 is opened so that the pulses applied to the servo system B appear on an output connection 230 of the AND gate 227. The connections 228, 230 are connected to the input of an OR gate having an output connection 231 connected to one input of an AND gate 232. The AND gate 232 is controlled by a flip-flop corresponding to the flip-flop 88 of the first-described embodiment and given the same reference numeral and which operates to open and close the gate 232 at the beginning and the end of the movements, respectively, in the manner described in the first embodiment. The gate 232 has an output connection 233 connected to the input of the counter 30.

From the foregoing, it can be seen that the use of a single displacement register and counter 30 will simplify the system.

It can now be seen that the present invention has provided a new and improved system for effecting motion along the coordinate axes to define a locus and, particularly, a new and improved system wherein the points along the axes may be defined in terms of coordinates which are the displacements along the coordinate axes from the preceding points. While a preferred form of the invention has been described in considerable detail, it is to be understood that further modifications, constructions and arrangements will occur to those skilled in the art but yet will fall within the scope and spirit of the present invention.

What I claim is:

1. In a system for effecting movement along a path which is the resultant of the velocities of movement along first and second coordinate axes and which includes first and second pulse responsive means for effecting movement along said first and second coordinate axes respectively at rates dependent upon the frequencies of the applied pulses, the combination of means providing a pulse train of a predetermined frequency, means providing a second pulse train having a frequency related to said predetermined frequency by the ratio of the magnitude of said velocities whereby said frequencies of said pulse trains have the same ratio as the magnitude of said velocities defining each resultant, and switching means for selectively applying either of said pulse trains to either of the said pulse responsive means and the other of said pulse trains to the other of said pulse responsive means.

2. In a system for effecting movement along a path which is the resultant of the velocities of movement along first and second coordinate axes and includes first and second pulse responsive means for effecting movement along said first and second coordinate axes respectively at rates dependent upon the frequencies of the applied pulses, the combination of means providing a pulse train of a predetermined frequency, means providing a second pulse train having a frequency related to said predetermined frequency by the ratio of the magnitude of said velocities whereby said frequencies of said pulse trains have the same ratio as the magnitude of said velocities defining each resultant, switching means for selectively applying either of said pulse trains to either of the said pulse responsive means and the other of said pulse trains to the other of said pulse responsive means, an intelligence carrying record having successive intelligences thereon as to which of said velocities for each resultant has the larger magnitude, and switch control means for said switching means and responsive to said record to switch said first pulse train to said first pulse responsive means when one of said velocities is larger and to the second pulse responsive means when it is smaller than the other velocity and to simultaneously switch the second pulse train to the other of said first and second pulse responsive means.

3. In a system for effecting movement along a path which is the resultant of the velocities of movement along first and second coordinate axes and includes first and second pulse responsive means for effecting movement along said first and second coordinate axes respectively at rates dependent upon the frequencies of the applied pulses, the combination of pulse generating means providing a first pulse train of a predetermined frequency, multiplier means having an input connected to said pulse generating means to receive said pulse train and adjustable to multiply the first pulse train by a factor to provide a second pulse train having a frequency related to said predetermined frequency by the ratio of the magnitude of the said velocities whereby said frequencies of said pulse trains have the same ratio as the magnitude of said velocities defining each resultant, and control means for selectively applying either of said pulse trains to either of the said coordinates and the other of said pulse trains to the other of said coordinates, an intelligence carrying record having intelligence thereon indicating the larger and the smaller of said velocities and the ratio of velocities, interpolating means responsive to said record and including means for actuating said control means to apply said first pulse train to said first coordinate axis when one of said velocities is larger and to the second coordinate axes when the other of said velocities is larger, and means for setting said multiplier means to multiply said first pulse in accordance with the ratio of said velocities.

4. In a system for controlling movement in accordance with a digital pulse train, a pulse generator, a pulse multiplying circuit having an input to which pulses from said generator are applied, said circuit including a binary register comprised of a plurality of binary elements for registering a number determinative of the multiplier of said circuit, a storage register comprised of a plurality of binary elements, there being a binary element in the storage register for each of said binary elements of said binary register, gate means, transfer means for interconnecting said binary elements of said storage register and binary register and operable to set a number in the latter corresponding to the number in the storage register, said transfer means including gate means normally rendering said transfer means effective only when a transfer voltage is applied thereto, each of said binary elements having an input effective to set the elements to receive the next number to be registered, a record reading means for reading intelligence and setting said storage register in accordance therewith, pulse generating means providing a pulse signal when a transfer is to be effected between said registers, a pulse delay circuit, means applying said pulse signal to said delay circuit and to said inputs of the binary elements of the register of said multiplying circuit, a second pulse delay circuit, means connecting the output of said first pulse delay circuit to said transfer means to provide said transfer voltage and to said second delay circuit, means connecting the output of said second pulse delay circuit to said inputs of the binary elements of said storage register and to said reading means, said reading means including means responsive to the pulse from said second pulse delay circuit for controlling the operation of the reading means to set a new number in said storage register.

5. In a system including a rotating spindle and first and second servos for producing simultaneous movement along first and second coordinate axes respectively in timed relationship to spindle rotation, a pulse generator responsive to spindle rotation and producing pulses having a frequency dependent on the rate of rotation, pulse train multiplying means for providing an output pulse train having a frequency and number of pulses related to an input train by a predetermined factor and including registering means presettable to a number to determine said factor, said factor being equal to or varying from one in one direction only, switching means for selectively switching the pulse train from said generator to either of the said servo systems, switching means for selectively switching the pulse train from said multiplier to either of said servo systems, and switch control means having first and second states for respectively actuating said switching means to apply one of said trains to the first and second servos respectively and the other of said trains to the second and first servos respectively.

6. In a servo system comprising a source of command pulses, a servo motor to be operated a unit distance for each command pulse, motion transducer means providing a pulse for each unit of distance of movement of said servo motor, a bidirectional error counter having add and subtract terminals and adapted to register a number therein, said counter adding a count of one to the number therein for each pulse applied to the add terminal and subtracting a count of one for each pulse applied to the subtract terminal, and digital-to-analogue converting means connected to said counter and having output terminals at which an analogue voltage appears representing the analogue of the number in said counter including a reference voltage source providing a reference voltage equal in magnitude to the voltage at the output terminals of said digital-to-analogue converting means when a predetermined number larger than zero is registered in said counter, comparator means for comparing the voltage at the output terminals of said converting means with said reference voltage and providing an output signal of one sense when the other voltage is the larger, the magnitude of said output signal depending upon the difference of said voltages, means connecting the output of said comparator means to said servo motor to effect operation thereof in one direction when said output signal is of one sense and in the other direction when of the other sense, means for selectively applying said command pulses to one of said add and subtract terminals to effect operation of the motor in one direction and to the other of said terminals to effect operation in the opposite direction, and means connecting said motion transducer means to apply the pulses therefrom to the one of said add and subtract terminals different from the one to which said command pulses are applied.

References Cited by the Examiner

UNITED STATES PATENTS 2,922,940   1/1960   Mergler _____ 235—154 X

MALCOLM A. MORRISON, *Primary Examiner.*

CORNELIUS D. ANGEL, *Examiner.*

D. W. COOK, *Assistant Examiner.*